INVENTOR.
ADOLPH RONNING
BY
Carlsen y Hogle
ATTORNEYS

United States Patent Office 2,948,545
Patented Aug. 9, 1960

2,948,545
BRAKE TORQUE REACTORS FOR STEERABLE WHEELS

Adolph Ronning, 4826 E. Weldon Ave., Phoenix, Ariz.

Original application June 20, 1952, Ser. No. 294,605, now Patent No. 2,812,953, dated Nov. 12, 1957. Divided and this application Oct. 18, 1957, Ser. No. 690,940

10 Claims. (Cl. 280—87)

My invention relates to brake torque reactors for the brake-equipped steerable wheels of vehicles, and the primary object is to provide reactor means for association with the brake systems of such suspensions in such fashion as to counteract the undesirable effects of brake torque reaction and bring about an increase in the aggregate braking efficiency as well as a reduction of undesirable effects thereof upon steering the wheels.

Considering first the common motor vehicle wheel, and brake assembly, there is a journal for the wheel and an axle on which the journal is carried and by which the vehicle load is transmitted to the wheel. The common brake for such assembly includes an annular drum carried by and rotating with the wheel and a non-rotating backing plate carried by the stationary axle assembly, on which plate are the brake shoes which are applied to the drum to brake the wheel. There are, of course, many variations of this general arrangement but all include relatively rotatively and non-rotating brake parts and my invention is applicable to all. For convience sake, however, the present disclosure will relate to the common brake assembly as just described. Now when the wheel is braked, by applying the shoes to the drum, there is set up what is called a brake torque reaction, the effect of which is to tend to cause the non-rotating parts to rotate with the rotating parts, and the wheel. Of course, this force is resisted and the non-rotating parts are not permitted to rotate with the wheel but in extreme cases, where the vehicle is heavily loaded, is traveling at high speed and the brakes are forcibly applied, or in making what is commonly known as a panic stop, this force is sufficient so that damage sometimes occurs to parts of the wheel assembly. In addition it is regarded as desirable to cushion the instantaneous application of the torque to the supporting parts carrying the wheel since braking is thus made smoother and less likely to cause any of the known ill results resulting from the present un-cushioned braking of the wheel.

The problems arising from this brake torque reaction are more acute where the wheels are swingably supported for up and down movement as in the case of wheel suspensions of the nature disclosed for example in my Patent No. 2,612,387, issued September 30, 1952, in which it will be noted that the wheels are arranged in pairs, journaled on the rear ends of cranked axles which are pivoted and differentially connected at their forward ends for interdependent up and down swinging movements about their pivots. The purpose as explained in detail in that patent is to differentially compensate the wheels and equalize load distribution thereto under all conditions, with transmission of minimum vertical acceleration or deflection of the vehicle itself. The solution to the problems arising from brake torque reaction in such suspension is set forth and claimed in my copending application Serial No. 294,605, filed June 20, 1952, for Brake Torque Reactors, now Patent No. 2,812,953, issued November 12, 1957, from which the present application is a division.

The present invention is directed to curing the undesirable effects of brake torque reaction on steerable wheel suspensions, particularly and although not of necessity of the differentially compensated type, such as disclosed as one example in my Patent No. 2,650,100, issued August 25, 1953. In this steerable suspension the wheels are again carried at the rear ends of cranked axles and these axles are pivoted and differentially connected at their forward ends and are also arranged for dirigible movements in unison about an upright steering or caster axis. It will be noted that in such differentially compensating suspensions the wheels are journaled on axle elements which may swing upwardly and downwardly and which trail from forward points of steerable attachment to the vehicle. In considering the effect of brake torque upon these types of assemblies, it will be readily understood that the brake torque reactive forces are normally effective about the axis of rotation of the wheels but that such forces will have an angular component effective about the pivot axes of the cranked axles. From the outset I have believed that this brake torque reaction may possibly have a tendency to cause these wheels to in effect "kick up" very slightly when the brakes are forcibly applied with the result that there may be a small but still very undesirable momentary reduction in wheel and load contact with the road surface. Just what effect this will have on the aggregate braking efficiency of all of the wheels of a vehicle is even now not entirely clear, but it is believed to be particularly desirable to counteract the effects of brake torque reaction upon steerable wheels and to apply the brake torque reaction to the vehicle in some fashion which will tend to increase the aggregate braking efficiency, and bypass the differential compensating mechanism connecting the wheels where same is used. It will, of course, be recognized by those skilled in the art that in high speed, over-the-road vehicles any diminution of braking efficiency or interference with accurate steering, however slight, is something to be avoided at all costs.

Bearing in mind the foregoing aspects of brake torque reaction particularly as regards steerable, differentially or swingably mounted wheels, it is the primary object of my invention to provide means, or what I prefer to call reactors, by which brake torque reaction may be transmitted directly from the wheel brakes to an adjacent steerable support and thence to the vehicle frame, completely bypassing the differential compensating mechanism where used, and without in the least interfering with either the steering or the up and down compensating movements of the wheels; and which by removing the effect of this torque reaction from the axes of rotation of the wheels to points removed from such axes it counteracts any "kick up" tendency which there may be. In carrying out my invention I permit limited angular displacement or rotation of what has heretofore been the strictly stationary parts of the brake assemblies, so that the immediate effect of the torque, as the brakes are applied, is to tend to cause these parts of the brake assemblies to instantaneously turn a short distance with the wheels. This very limited rotation of these brake parts, as the brakes are applied, is used to distribute the torque reaction as between the differentially compensated wheels of my suspension even if the brakes are slightly uneven in adjustment so that load distribution as between the wheels remains constant and as a further object of the invention I provide means for cushioning the limited movement and absorb at least a part of the shock forces incident to braking the wheels.

The foregoing and other objects of my invention will be made clear in the course of the following specification, and reference is now invited to the accompanying drawings, wherein—

Fig. 3 is an enlarged and detail view, partially in section, of another form of link usable in the torque reactor of Fig. 1.

Figure 1:
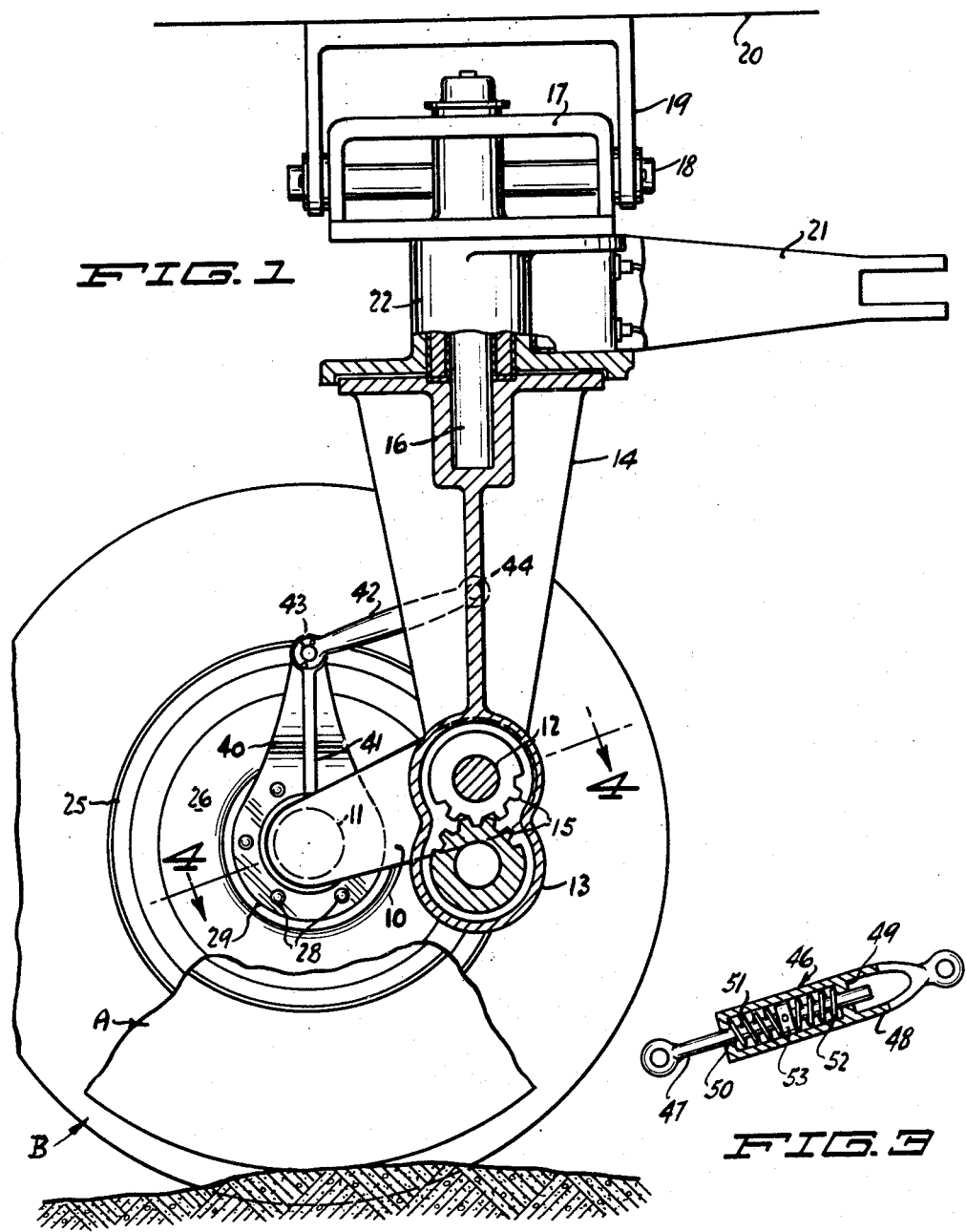
Fig. 1 is a longitudinal and vertical sectional view through a steerable, differentially compensating vehicle suspension with only the lower portion of the near wheel shown and illustrating one fundamental form of brake torque reactor, according to my invention, embodying a link connection between the brake system and the steerable element to which the wheels are connected.

Referring now more particularly and by reference characters to the drawing there is shown in Fig. 1 thereof a dual wheel, differentially compensating type of steerable suspension like that appearing in the parent application hereof and similar in many respects to that shown in my prior Patent No. 2,650,100 hereinbefore identified. In this assembly a pair of close spaced wheels A and B is provided with the wheels journaled for rotation upon the rear ends of generally forwardly extending cranked axles 10, the rear ends of which are provided with journals 11 for mounting the wheels. The forward ends of the axles 10 are provided with reversely and relatively inwardly turned trunnions 12 by which they are journaled in a housing 13 carried upon or formed as a part of a generally upright steerable member or pedestal 14. Within said housing 13 the aforesaid trunnions are operatively connected by meshing, partially toothed gears 15 and the arrangement is thus such that the rear, wheel supported ends of the axles may swing relatively up and down, always in opposite directions, with a differential compensating action such that the wheels A—B will maintain road contact even under rather rough surfaces with a minimum vertical acceleration or deflection of the vehicle and, of course, so that the load from the vehicle will at all times be equally distributed between the wheels. The steerable member or pedestal 14 is here shown as mounted for dirigible movements about a pin 16 carried by a transversely extending bolster 17 which is mounted for oscillation in a transverse, vertical plane by means of a fore and aft extending pin 18 carried by bracket 19 affixed to the vehicle, a mounting surface of which is designated at 20. In this form of structure there will be a pair of wheel assemblies A—B, one adjacent each end portion of the bolster 17, and provision is made for steering these assemblies in unison by any suitable connection (not shown) to a steering arm 21 which is operatively connected to a bearing 22 for the aforesaid pin 16 and to said member 14. On the other hand, in a tricycle type of vehicle only one such assembly of wheels A—B would, of course, be employed and at this point I make clear the fact that I do not restrict the application of the teaching of my present invention, insofar as it relates to the proper distribution of brake torque reactive forces from steerable wheels, to the dual wheel and compensating type of vehicle suspension here illustrated. As will be readily understood to those skilled in the art, a single steerable wheel carried for example upon a steering knuckle (not shown) might have its brake torque reaction carried to the vehicle frame in a manner very like that which will presently appear, and this is regarded as with the scope of the present invention.

Figure 4:
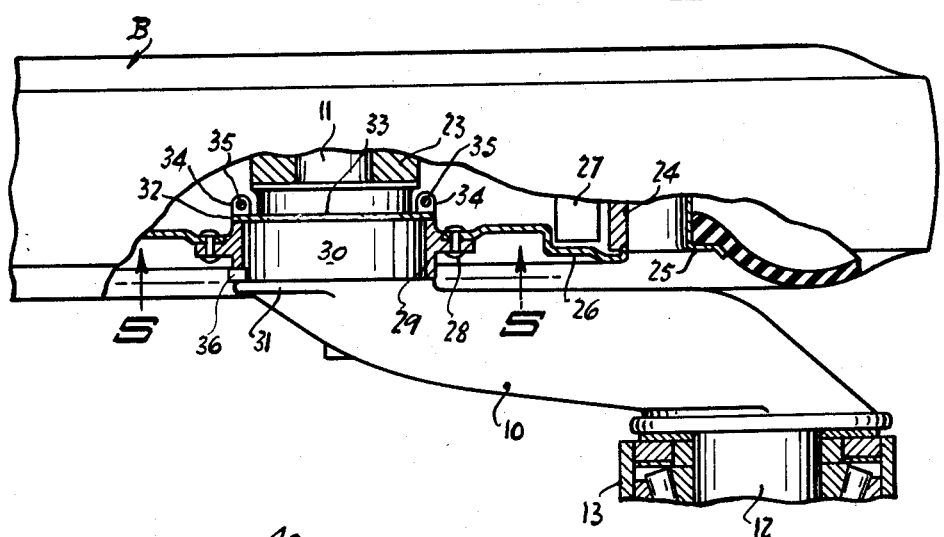
Fig. 4 is an enlarged fragmentary plan and sectional view taken in general along the plane indicated by the line 4—4 in Fig. 1 and illustrating the manner in which the previously stationary part of the brake mechanism is now arranged for limited rotation or oscillation.
Figure 5:
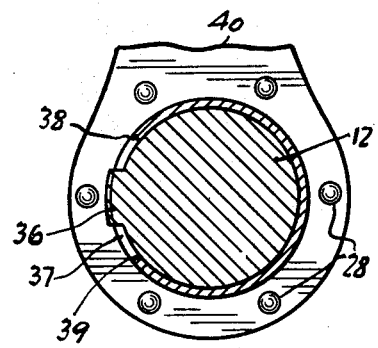
Fig. 5 is a section along the line 5—5 in Fig. 4 illustrating the bearing structure for the brake mechanism and one manner in which the requisite fail-safe operation may be provided and the rotation of this part of the brake mechanism positively limited under all circumstances.

Turning for the moment to Figs. 4 and 5 it is seen that one of the cranked axles 10 is illustrated upon a larger scale along with its associated wheel B, which wheel has a suitable bearing 23 for rotatable mounting upon the aforesaid outwardly extending journal 11 of the axle. Forming a part of the overall structure of the wheel, of course, is a brake assembly and the same includes a brake drum 24 which rotates with the wheel and which is located inwardly of the wheel rim 25. Also forming a part of the brake assembly is a backing plate 26 and one or more brake shoes, only one of which appears at 27. In the ordinary instance the backing plate 26 is rotationally stationary and the brake shoes associated with this backing plate, when applied against the drum 24, will frictionally brake the wheel under control of any suitable and well known form of actuating means (not shown) whether it be hydraulic, vacuum or other type. In accordance with my invention, however, the backing plate 26 is mounted for positively limited rotation as the brakes are applied, with the wheel rotating in either direction, and for this purpose the backing plate 26 is riveted or otherwise secured at 28 upon a flanged bearing collar 29 rotatably mounted upon a bearing surface 30 at the rear end of the axle 10 and, of course, coaxial with the adjacent wheel journal 11. Axial displacement of the collar 29 is prevented by engagement with an annular shoulder 31 formed upon the rear end of the axle 10 and with a retainer ring 32 engaged in a peripheral groove 33 in the axle immediately outward of the aforesaid bearing 30 as clearly appears in Fig. 4. For convenience in assembly this retainer ring 32 may be made up in two semi-circular sections provided with mating apertured lugs 34 at their extremities to receive tie bolts 35.

It is, of course, very important for safety's sake that this permissible rotation of the brake backing plate 26 be positively limited and for this purpose a radially projecting stop lug 36 is formed upon the bearing 30 and extends outwardly through an angularly extending slot 37 formed in the collar 29 mounting the backing plate, as is best seen in Fig. 5. Obviously the collar 29 and its associated backing plate 26 may turn with the wheel as the brakes are applied only until the stop lug 36 engages one of the ends 38 or 39 of the slot 37, at which point the backing plate is held until the wheel is braked to a stop, or until the brakes are released.

It will now be evident that as the brakes are applied to the wheels A—B their associated backing plates 26 will tend to turn through a short angular arc or movement until halted by the lug 36, as a result of brake torque reaction, and that this motion of the backing plate 26 will directly reflect the brake torque reactive forces as has been described in detail in the application parent to this, now Patent No. 2,812,953. This limited motion of the backing plate 26, as a result of the reactive forces of brake torque as the wheels are braked, is utilized to transmit and distribute these forces directly to the vehicle without interfering with the steering of the wheels. It must be understood that these torque reactive forces, which become relatively tremendous at high speeds and during hard braking, normally are effective about the axes of rotation of the wheels and this interferes with the steering of wheels of all vehicles to some extent and is particularly serious in connection with dual wheels of the differentially compensated type such as herein shown. For example, in braking steerable dual wheels of this kind if the brakes of one wheel are set up a bit tighter than the brakes of the other then the first wheel will have a tendency to "dig in" under hard braking, causing the opposite wheel to tend to move upward slightly and lose at least some small fragment of its tractive engagement with the road surface. Furthermore, in dual differentially compensated wheels the effects of brake torque reaction upon the gears or other mechanism connecting the axles 10 for interdependent differentiating upward and downward movements in undesirable, and all of these factors become particularly aggravated when the vehicle is traveling in a rearward direction.

Now in Fig. 1 of the drawing I show the flanged collar 29 of the brake assembly of the far wheel B as provided with an integral lever arm 40 extending radially with respect to the axis of rotation of the wheel and in a generally upward direction. When this lever arm 40 is formed as an integral part of the backing plate mounting collar it is desirable to provide thereon a stiffening rib 41, and in order to bring the arm 40 inward from the wheel sufficiently to clear the rim thereof the arm may be suitably bent as designated by the shade lines. Obviously, however, the lever arm 40 might be a separate part secured in some suitable way to the brake backing plate 26 and I do not accordingly limit myself to the structure as here shown, nor do I limit myself to the particular direction or angle at which the lever arm leaves the axis of rotation of the wheel. However, as seen in Fig. 1, the effective brake torque reaction, when the brake is applied to wheel B would tend to cause the upper end of the arm 40 to travel in a forward arc the short distance permitted by the stop lug 36, assuming, of course, that the wheel is traveling in a clockwise direction for forward travel of the vehicle. This restricted motion of the lever arm 40 is resisted by means of a brake torque reactor in the form of a link 42, the rear end of which is pivoted at 43 to the upper end of the lever arm and the forward end of which is pivoted at 44 to the steerable member 14 carrying the wheel. Thus the forces generated by brake torque reaction are transmitted directly to the said steerable member 14 and thence to the supported vehicle, and in the case of a rigid link of Fig. 1 there would actually be no movement of the lever arm 40 at all, but as will be readily understood to those skilled in this art the brake torque reaction is removed entirely from the wheel and the axle structure, while the differential connecting mechanism is bypassed and the forces applied to the steerable member 14 thus accomplishing my ends in an exceedingly simple and satisfactory manner. There will, of course, be a lever arm 40 and a brake torque reactor link 42 for each wheel A—B and the links are arranged so that a line passing through their pivots 43—44 will parallel a line intersecting the journals 11 and trunnions 12 of the associated axles so that each link and its axle acts in parallel motion and there is no interference whatsoever with the differentiating up and down movement as between the wheels.

It may be noted that particularly where a longitudinally non-elastic link such as that shown at 42 is used the stop lug 36 and its associated slot 37 cooperate simply to form a fail-safe mechanism so that breakage of the link, shearing of its pivots or even breakage of the lever arm 40 will not render the brakes of the associated wheel ineffective.

Figure 2:
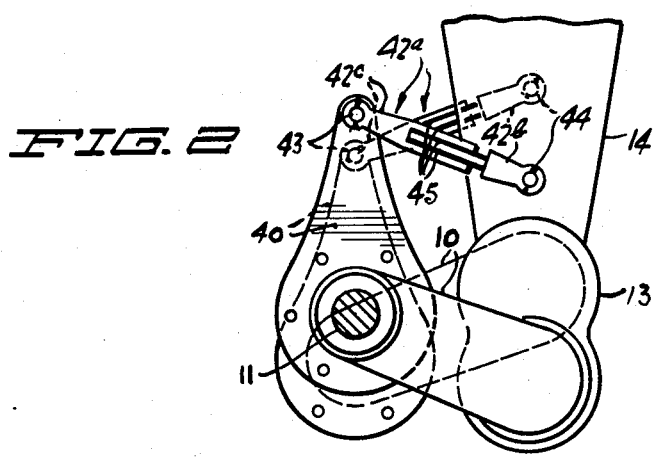
Fig. 2 is a detail and side elevation of the lower portion of the assembly of Fig. 1 with both wheels omitted but showing parts of the brake assemblies and both cranked axles and illustrating one form of link having longitudinal resiliency for cushioning torque reaction.

It is desirable in my estimation that the application of the brakes to wheels of the steerable variety, and particularly of the differentially compensating type, should be cushioned to some extent and this is made possible by my arrangement of the brake backing plates for safe limited rotational movement as the brakes are applied. For example, as is seen in Fig. 2, each link designated at 42ª therein may be made up of front and rear sections 42ᵇ and 42ᶜ one of which in effect telescopes or slidably interfits into the other. Where these link sections 42ᵇ—42ᶜ overlap they may then be bonded together by rubber or other resilient material, as seen at 45, by some of the known modern methods of manufacture so that yieldable and limited relative movement of the link sections is permitted or in effect so that the length of the links themselves may vary whether they are subjected to tension or compression by the effects of brake torque reaction. This relative movement of the link sections will, of course, be quite limited but it will be nevertheless sufficient to slightly cushion the initial application of the brakes as will be understood.

In Fig. 3 I show another form of link for yieldably transmitting the effects of brake torque reaction and the same is designated generally at 46, having a rear rod portion 47 and a forward hollow portion 48 into which said rod slidably projects. The hollow section 48 of the link is formed with inwardly turned annular stops 49 and 50 against which are braced the opposite ends of a pair of expansion coil springs 51 and 52, the proximate ends of which are braced upon a collar 53 secured to the rod section 47 in a central location. The springs 51—52 thus resist relative motion of the link sections 47—48 and this type of link may be substituted for that shown in Fig. 2 if so desired.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a wheel suspension including a steerable element and wheels connected thereto by differentially connected cranked axles swingable up and down with respect to said steerable element, brake mechanisms for the wheels each comprising cooperating brake parts with one connected to rotate with the wheel and the other connected to the axle, the latter brake part being operatively journaled for limited rotation on the axle as the result of brake torque reaction, and a link element connecting each of said axle mounted brake parts to the steerable element for transmitting the brake torque reaction.

2. In a wheel suspension including a steerable element and wheels connected thereto by differentially connected cranked axles swingable up and down with respect to said steerable element, brake mechanisms for the wheels each comprising cooperating brake parts with one connected to rotate with the wheel and the other connected to the axle, the latter brake part being operatively journaled for limited rotation on the axle as the result of brake torque reaction, link elements connecting said axle mounted brake parts to the steerable element for transmitting the brake torque reaction, and the said link elements operating in parallel motion with the cranked axles.

3. In a wheel suspension including a steerable element and wheels connected thereto by differentially connected cranked axles swingable up and down with respect to said steerable element, brake mechanisms for the wheels each comprising cooperating brake parts with one mounted to rotate with the wheel and the other mounted on the axle, the latter brake part being operatively journaled for limited rotation on the axle as the result of brake torque reaction, link elements connecting said axle mounted brake parts to the steerable element for transmitting the brake torque reaction, and the said link elements being positioned parallel with lines passing through the axle pivots and the wheel axes.

4. In a wheel suspension including a steerable element and wheels connected thereto by differentially connected cranked axles swingable up and down with respect to said steerable element, brake mechanisms for the wheels each comprising cooperating brake parts with one mounted to rotate with the wheel and the other mounted on the axle, the latter brake part being operatively journaled for limited rotation on the axle as the result of brake torque reaction, brake torque reactor links pivoted at one end to each said brake part of limited rotation and the steerable element, and each of said links paralleling its associated axle.

5. In a vehicle, a steerable support for the vehicle frame, comprising a wheel, a steerable member operatively connecting the wheel to the frame and transmitting load from the frame to the wheel, brake mechanism for said wheel including cooperating brake parts one rotating with the wheel and means mounting the other of said parts relative to said steerable member for only restricted rotation with the wheel as a result of brake torque reaction forces when the wheel is braked, and brake torque reactor means distinct from said mounting means for said last mentioned brake part and connecting the same through said steerable member to the vehicle frame to transmit brake torque reaction to the vehicle frame.

6. A steerable wheel suspension for a vehicle frame, comprising in combination, a pair of close spaced and brake equipped wheels, cranked axles having journals at their rear ends for the respective wheels, differential mechanism swingably connecting the forward ends of the axles for differential up and down movements at their rear ends, a steerable member supportably and steerably connecting the said differential mechanism to the frame, and mechanism operative to bypass the effects of brake torque reaction from the differential mechanism to transmit the same to the frame.

7. A steerable wheel suspension for a vehicle frame, comprising in combination, a pair of close spaced and brake equipped wheels, cranked axles having journals at their rear ends for the respective wheels, differential mechanism swingably connecting the forward ends of the axles for differential up and down movements at their rear ends, a steerable member supportably and steerably connecting the said differential mechanism to the frame, and mechanism operative to bypass the effects of brake torque reaction from the differential mechanism to transmit the same to the frame, said mechanism including links paralleling the axles and connected from the respective wheel brakes to said steerable member.

8. A wheel suspension for a vehicle frame, comprising in combination, a pair of close spaced and brake equipped wheels, cranked axles having journals at their rear ends for the respective wheels, differential mechanism swingably connecting the forward ends of the axles for differential up and down movements at their rear ends, means supportably and steerably connecting the forward ends of said axles to the frame, links connected between the wheel brakes and said steerable means and operative to remove the effects of brake torque reaction from the differential mechanism and transmit the same to the frame, said links each including a pair of relatively longitudinally movable sections and rubber bonded to provide limited longitudinal elasticity.

9. A wheel suspension for a vericle frame, comprising in combination, a pair of close spaced and brake equipped wheels, cranked axles having journals at their rear ends for the respective wheels, differential mechanism swingably connecting the forward ends of the axles for differential up and down movements at their rear ends, means supportably and steerably connecting the forward ends of said axles to the frame, links connected between the wheel brakes and said steerable means and operative to remove the effects of brake torque reaction from the differential mechanism and transmit the same to the frame, said links each comprising relatively longitudinally movable sections, and oppositely reacting springs operatively arranged to yieldably resist relative movement of said sections in either direction with respect to each other, one section of each said link enclosing both of said springs.

10. A steerable wheel suspension for a vehicle frame, comprising in combination, a pair of axles having journals at their rear ends for the respective wheels, differential mechanism swingably connecting the axles for differential up and down movements at their rear ends, a steerable member supportably and steerably connecting the said differential mechanism to the frame, and mechanism operative for bypassing the effects of torque reaction past the differential mechanism to the frame.

References Cited in the file of this patent
UNITED STATES PATENTS

| | | |
|---|---|---|
| 1,841,415 | Moorhouse | Jan. 19, 1932 |
| 2,078,210 | Sanford | Apr. 20, 1937 |
| 2,241,193 | Garnett | May 6, 1941 |
| 2,244,853 | Ronning | June 10, 1941 |
| 2,520,778 | Page | Aug. 29, 1950 |